April 28, 1936.  H. B. WILCOX  2,038,777

MANOMETER

Filed Sept. 28, 1934

Inventor
Harold B. Wilcox
By: J. Adams
Attorney

Patented Apr. 28, 1936

2,038,777

UNITED STATES PATENT OFFICE 2,038,777

MANOMETER

Harold B. Wilcox, Avenal, Calif.

Application September 28, 1934, Serial No. 745,867

4 Claims. (Cl. 73—31)

This invention relates to manometers and similar indicating instruments in which glass sight tubes are used, and more particularly to a means for making fluid tight the juncture between the glass sight tube and the pressure chamber in the body of such a device.

Heretofore, in differential pressure manometers, gauge glasses and the like, the problem of making a fluid tight joint between the glass tubes usually found in such equipment, and the pressure chambers or passages in the main body or frame has been a serious one. Various expedients, such as stuffing boxes or glands, with soft or flexible packing, have been tried, but have not proved satisfactory, because of leakage, breakage of the glass during and subsequent to its installation, deterioration of the packing and other well recognized deficiencies.

Furthermore, in certain services such as are commonly met with in the petroleum refining, natural gas, and natural gasoline industries, breakage or leakage of a gauge glass or manometer tube may have very serious consequences, due to the inflammable and explosive nature of the fluids which may be released thereby. These difficulties, and others which will be apparent to those skilled in the art, have been substantially overcome by the present invention, which utilizes an elastic connector and a sleeve, made tight by the relative pressure of the fluid, to join the glass tube or its equivalent to the body or frame of the instrument.

It is an object of this invention to provide a means for securing a glass tube or cylinder into a passage or pressure chamber of a rigid frame or body such as a part of a manometer, pressure gauge, liquid level gauge or the like.

Another object is to provide a fluid-tight joint between a glass tube and a pressure chamber, in which a definite degree of flexibility is obtained, thereby avoiding strains and breakage of the tube by temperature and pressure changes, sudden jars or shocks, and vibration.

Another object is to provide a means for connecting a tube, which is not necessarily of glass or friable material, into a positive or negative pressure chamber by means of a sleeve and an elastic member which will automatically make the joint tight by virtue of the relative pressure acting thereon.

Another object is to provide a type of construction for a manometer, gauge glass, liquid level indicator or the like that will be simple and economical to fabricate and in which replacements of the breakable or fragile parts may be easily and quickly made.

These and other objects and advantages will become further apparent from the following description, and from the accompanying drawing which forms a part of this specification and illustrates a preferred embodiment of this invention.

Figure 3:
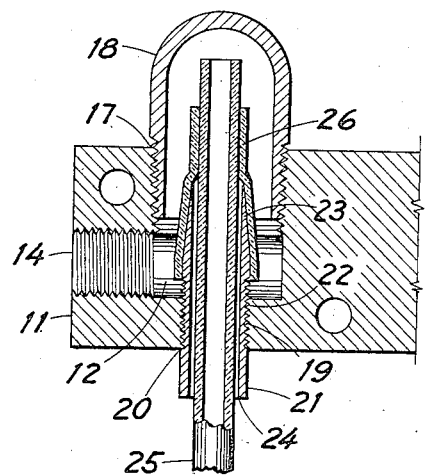
Figure 3 is a vertical sectional view on line III—III of Figure 2 and illustrates a preferred arrangement of the joint between the ends of the U-tube and the pressure connection or chamber.

Referring to the drawing, the numeral 10 represents the support frame of the manometer used in this example. At the upper end of the frame is a metal block or base 11 in which pressure chambers 12 are formed, and which may be secured to frame 10 by cap screws 13.

Figure 1:
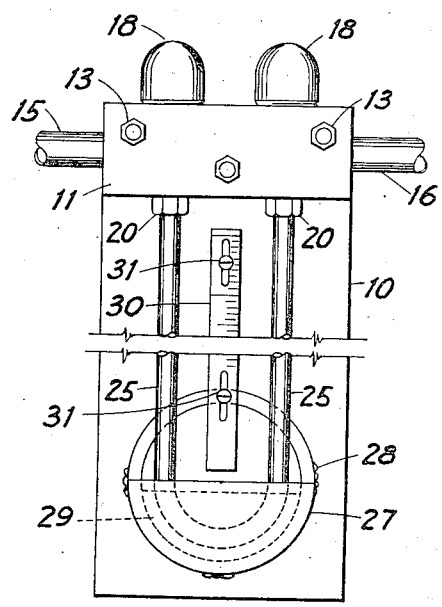
Figure 1 is a front view of a differential fluid pressure manometer to which this invention has been applied, and illustrates one method of anchoring the U-tube into the frame of the instrument.
Figure 2:
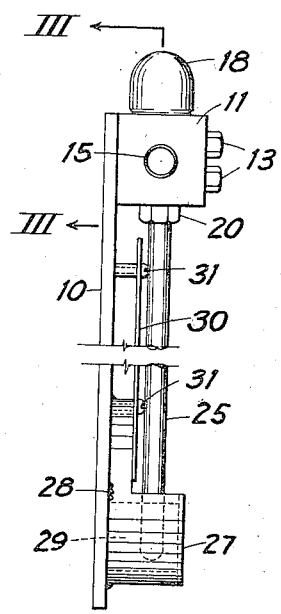
Figure 2 is a side view of the device shown in Figure 1.

Pressure chambers 12 are preferably threaded as at 14 so that the usual pipe lines 15 and 16 may be connected thereto. In the case of the embodiment shown in Figures 1, 2, and 3, each pressure chamber 12 is formed with a threaded opening 17, into which a threaded cap or bull plug 18 may be secured. Axially aligned with opening 17 but opposite thereto, and also communicating with chamber 12 is a threaded opening 19 for the reception of threaded sleeve 20.

Sleeve 20 is preferably but not necessarily shaped substantially as shown in Figure 3, with a hexagon or octagon head 21, a threaded portion 22 and a tapered end 23. Bore 24 of sleeve 20 is a loose fit for gauge glass or U-tube 25. A section of elastic tubing 26, which may be rubber or a solvent resistant synthetic material such as "Thiokol", is slipped over both the tapered portion 23 of sleeve 20 and the end of tube 25, before cap 18 is installed, and serves to make tight the joint between tube 25 and sleeve 20. The greater the pressure differential between the inside of pressure chamber 12 and the atmosphere, the more tightly will tubing 26 be forced against tube 25 and sleeve 20 to seal the same, thus forming what may be termed a pressure seal.

Obviously the pressure differential between chamber 12 and the atmosphere will tend to force tube 25 out of sleeve 20, due to the flexibility of the pressure seal, so that some means of opposing that force must be provided. One such means is shown on Figures 1 and 2, and is particularly adapted to U-tubes for fluid pressure differential gauges. Near the lower end of frame 10 is secured a semi-circular metal cup 27, as by welding at 28. After both upper ends of the U-tube 25 have been inserted into their respective sleeves 20, and the lower end of the tube 25 has been dropped back so that it is within the cup 27, the latter is filled with some suitable initially plastic material 29 such as sealing wax, plaster of Paris or the like, that will become hard. This will retain the lower end of tube 25 in place and will resist the down thrust of the pressure differential on the combined areas of the upper ends of tube 25 as they project into the pressure chambers 12. It is obvious, however, that any equivalent and adequate support for the lower end of tube 25 could be substituted for the means just described.

In case of breakage of the tube 25, the sealing material 29 may readily be chipped or melted out of cup 27 and a new tube installed by the process described.

A conventional scale 30 may be placed between the two legs of U-tube 25 and secured to frame 10 as by screws 31.

Figure 4:
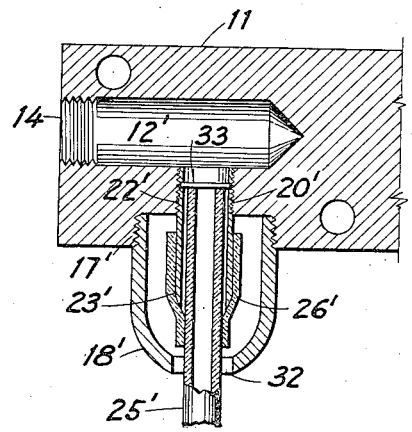
Figure 4 is a vertical sectional view similar to that of Figure 3, but adapted to a negative pressure apparatus such as a differential gauge in which a vacuum is maintained.

In the embodiment shown in Figure 4, where the pressure chambers 12' are at lower than atmospheric pressure, the arrangement of the sealing means must obviously be modified. In this case the sleeve 20' is reversed so that the tapered portion 23' surrounds the external portion of tube 25'. Elastic tubing 26' is placed over sleeve 20' and tube 25' thus forming a pressure seal due to the differential between the atmospheric pressure and the reduced pressure inside chamber 12'. Cap 18', which is drilled as at 32 to pass tube 25', may be threaded into recess 17' in block 11' forming a guard for member 26'. It holds no pressure and may be dispensed with if desired. In this case, the lower end of U-tube 25' must either be supported so that it will be prevented from being drawn upwardly into pressure chamber 12', or a stop such as pin 33 in sleeve 20' be provided to limit the travel thereinto.

Manometers and the like constructed according to this invention have been found to be particularly economical to build and maintain without the customary glass tube breakage, even in services where natural gas and gasoline have been in contact with the elastic tubing seals. Although a specific construction embodying this invention has been described and illustrated, it is to be understood that the invention is not limited to that specific device, and all such modifications and changes as come within the scope of the appended claims are embraced thereby.

I claim:

1. A manometer or the like comprising means forming a pressure chamber, a bore in said means communicating with said chamber, a rigid glass tube extending into said bore, a sleeve secured in said bore and surrounding said tube for a portion of its length, an elastic tubing member surrounding said sleeve and said tube at their juncture to form a flexible pressure seal therebetween, a recess in said first named means aligned with said bore, and a cap for said recess adapted to be removed to permit access to said elastic tubing member.

2. A manometer or the like according to claim 1, in which said recess is positioned on the opposite side of said pressure chamber from said bore and is aligned therewith, and said cap is adapted to form a tight closure for said recess and said pressure chamber, and in which said sleeve and said elastic tubing member extend into said pressure chamber to prevent outward leakage therefrom.

3. A manometer or the like, according to claim 1, in which said sleeve and said elastic tubing member extend outwardly from said pressure chamber along said glass tube to prevent leakage thereinto, and in which said recess surrounds said bore and said cap is provided with a central opening through which said glass tube extends.

4. A manometer or the like, according to claim 1, with the addition of means associated with said tube for preventing said tube from being displaced from its normal position in said bore by the pressure differential between the atmosphere and said pressure chamber.

HAROLD B. WILCOX.